Dec. 3, 1963　　　S. C. HETH ETAL　　　3,112,597
ROTARY POWER MOWER AND BAGGING ATTACHMENT THEREFOR
Filed Sept. 24, 1962　　　　　　　　　　　　5 Sheets-Sheet 1
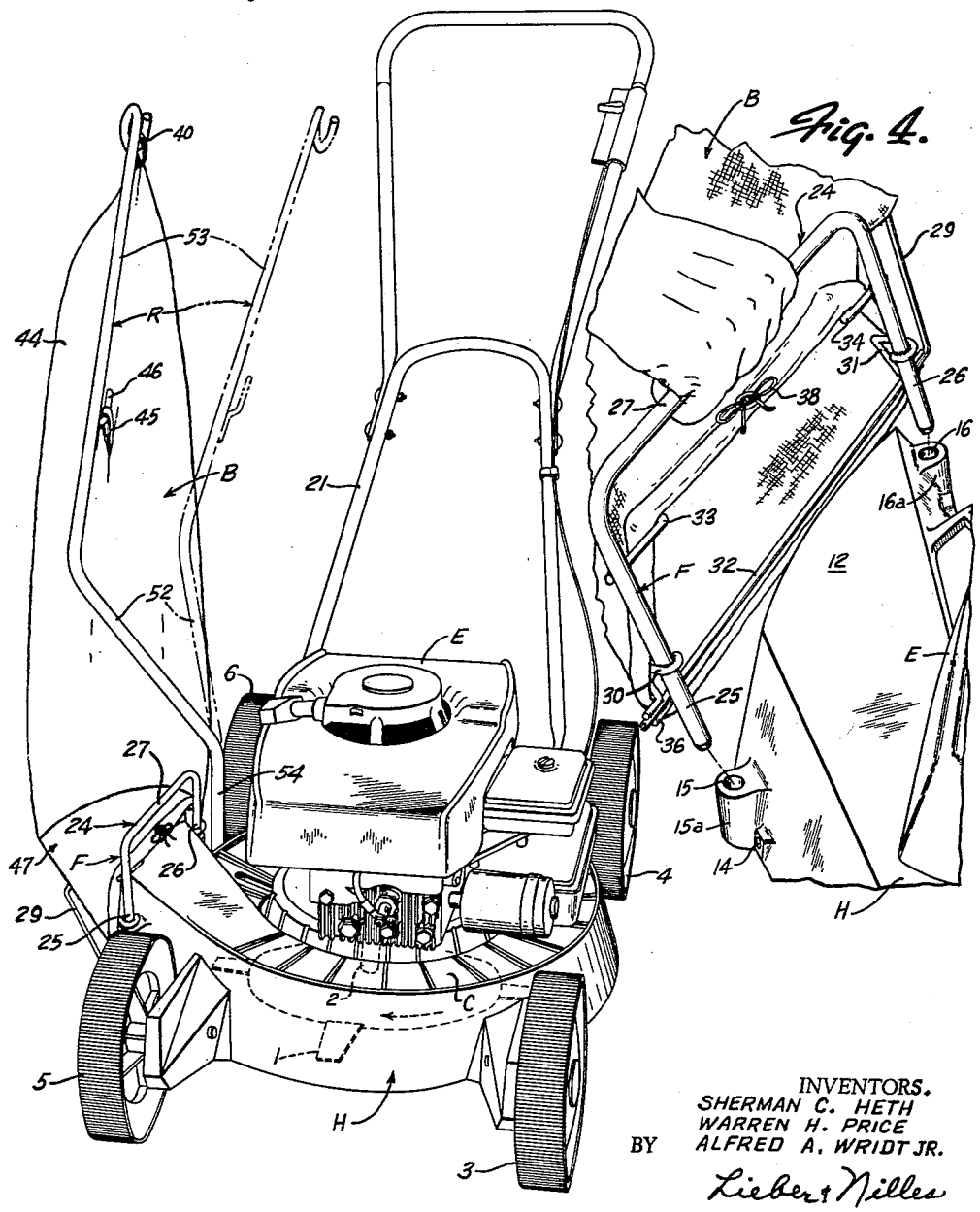
INVENTORS.
SHERMAN C. HETH
WARREN H. PRICE
BY ALFRED A. WRIDT JR.
Lieber & Nilles
ATTORNEYS

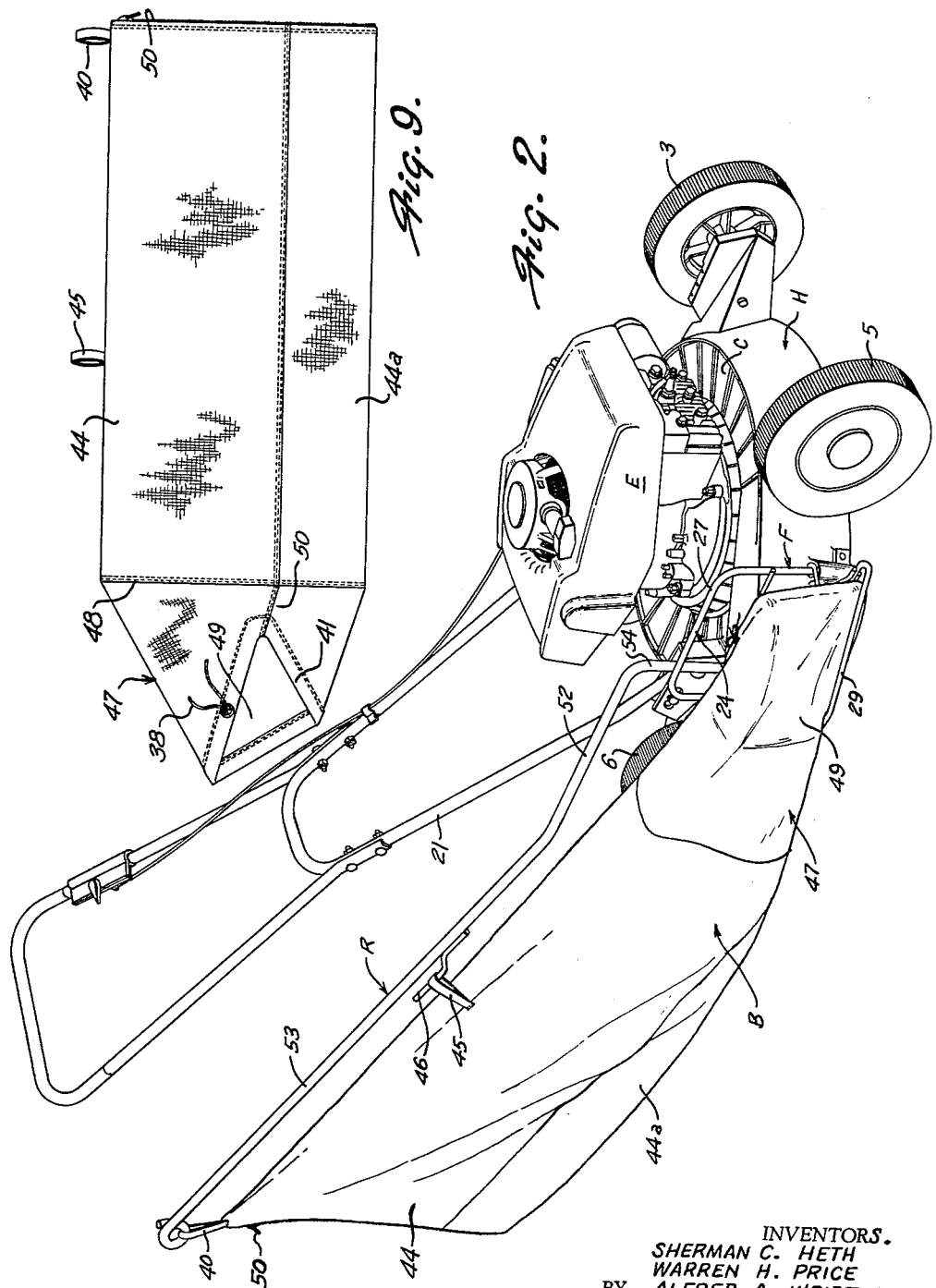

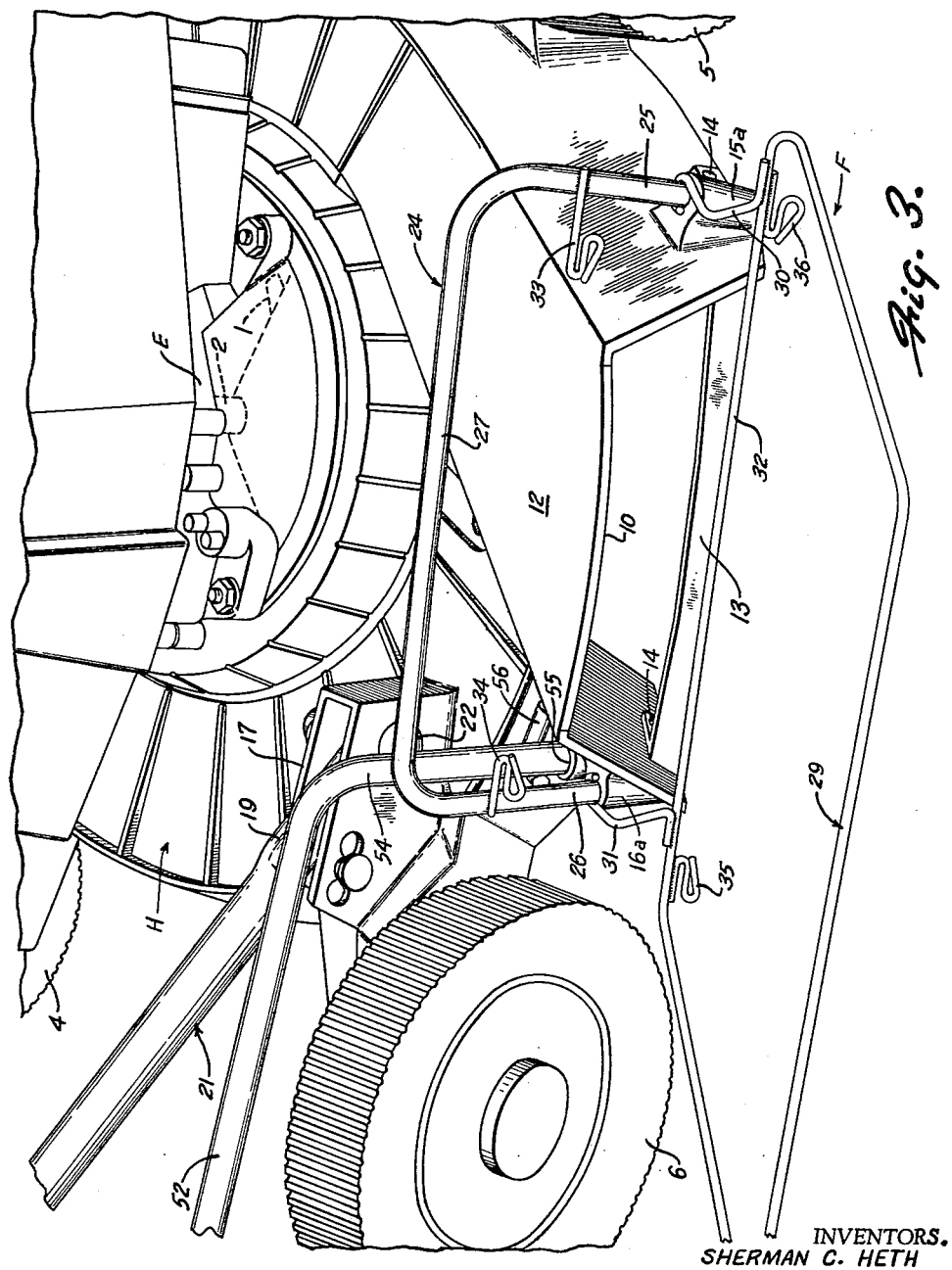

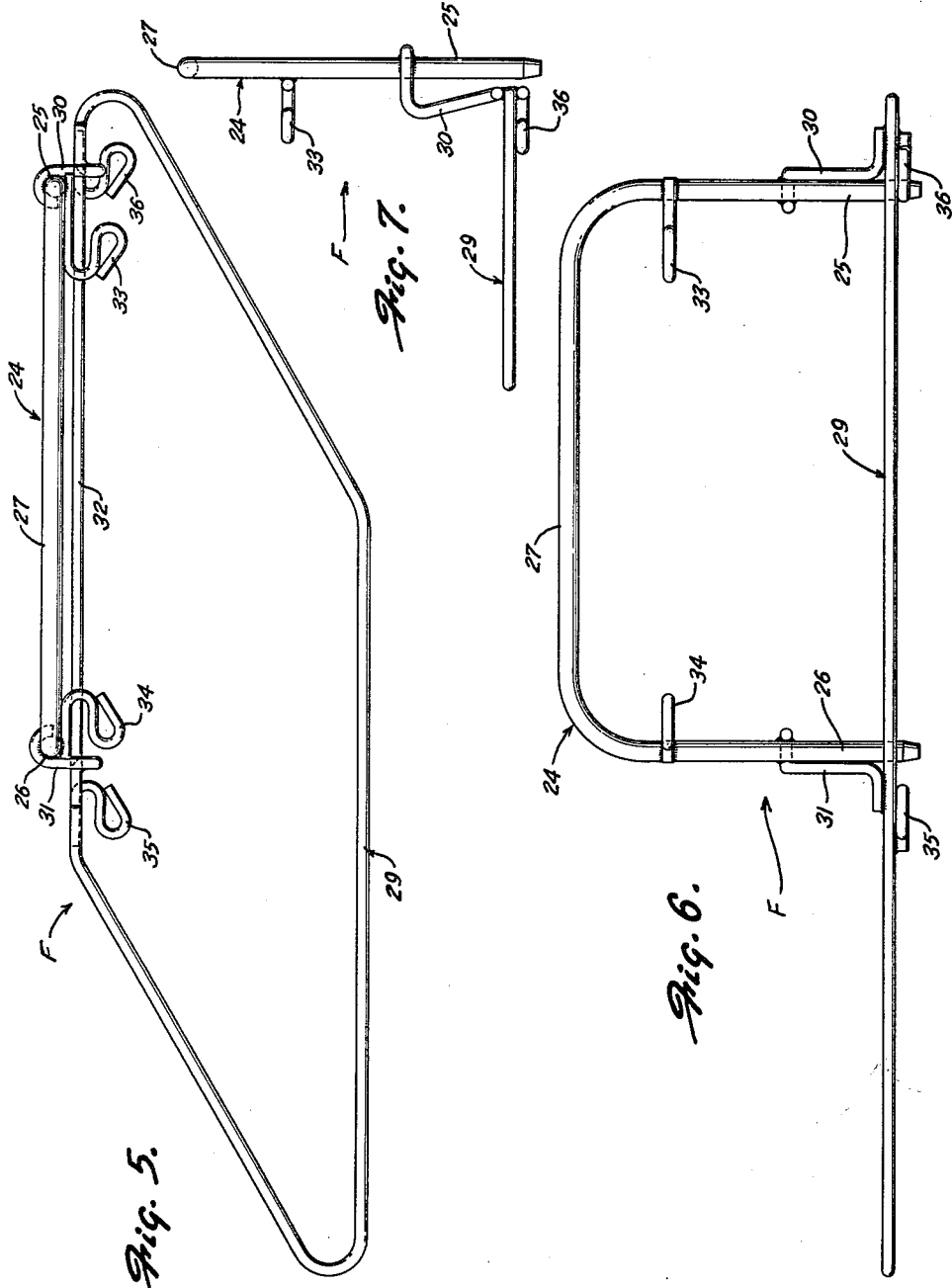

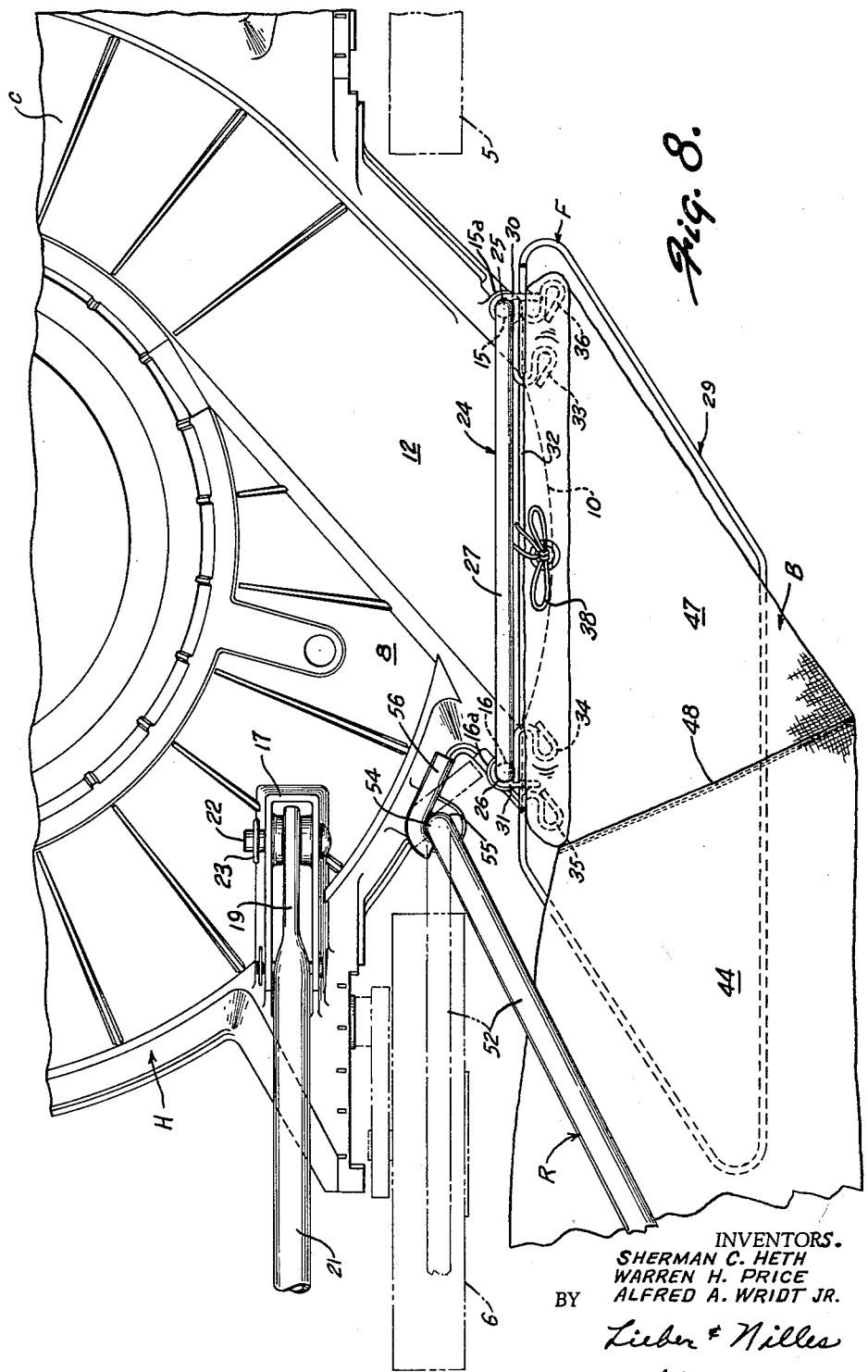

3,112,597
ROTARY POWER MOWER AND BAGGING ATTACHMENT THEREFOR

Sherman C. Heth, Racine, Warren H. Price, South Milwaukee, and Alfred A. Wridt, Jr., Racine, Wis., assignors to Jacobsen Manufacturing Company, Racine, Wis., a corporation of Wisconsin
Filed Sept. 24, 1962, Ser. No. 225,699
16 Claims. (Cl. 56—202)

This invention relates generally to rotary power mowers of the type having horizontally revolving cutter blades enclosed in an inverted and generally dish-shaped housing from which the blades forcibly eject the grass clippings and other debris such as twigs, stones, or dirt. More particularly, the present invention relates to mowers of this type which utilize detachable bags for collecting the clippings and other debris that is discharged from the mower.

Prior art mowers of this type have made provisions for ejecting the clippings in various directions relative to the line of normal travel of the mower. For example, some mowers eject directly laterally to one side, which direction is desirable because when the bag attachment is not used, the debris is then not blown at the operator at the rear of the mower, and furthermore the ejected clippings are dispersed more widely and do not form any windrows. Other prior art mowers eject the debris in other directions, such as, directly to the rear into catchers, forwardly, or selectively into combinations of directions.

When such mowers are to be used selectively with bagging attachments or alternatively to throw the clippings over the ground, it is preferable to have the elongated bag extend generally rearwardly so as to form no impediment to movement of the mower closely adjacent bushes, shrubs, or the side of buildings or the like. An example of such a mower is shown in the U.S. Patent No. 2,973,614 which issued on March 7, 1961, to Horner et al.

The device of the above-mentioned patent, however, has definite shortcomings; for example, it is necessary to have a separate chute for effecting the turning of the debris rearwardly and into the attached bag. When the bagging attachment is not used, it is necessary to detach the chute from the mower housing to permit the debris to be scattered laterally over the ground.

As these mowers eject stones and other debris at considerable velocities, it is dangerous for the operator to place his feet or hands too close to the lower part of the mower housing while the mower is running, and particularly dangerous for the operator to lean over the mower and place any part of his body adjacent the discharge opening of the mower. When the operator is in such a position, the mower may either move or be moved, or the operator may lose his balance or otherwise get his foot or hand in the blades, not infrequently resulting in the loss of an eye, fingers, or a foot.

In view of this inherent danger attendant to these mowers, it will be appreciated that the device shown in the said Patent No. 2,973,614 has several shortcomings from a safety standpoint. For example, the operator must stand closely adjacent the mower and place his hands in direct proximity to the discharge outlet when the chute is to be detached from the housing and taken off or when it is to be applied to the housing. Furthermore, with the said patented device, to be emptied the bag itself must be detached from and then reattached to the discharge end of the detachable elbow or chute, usually by means of a drawstring whenever the bag has been filled, which is very frequently. The operator will perform these functions while the mower is running, regardless of admonitions to the contrary to do so.

Another example of the prior art is illustrated in the Reissue Patent No. 24,955 to Campbell, granted March 28, 1961, which is of the strictly lateral discharge type. This structure also has shortcomings, although it does not require separate elbows for turning the material rearwardly, or deflectors for protecting the operator. For example, the obstruction formed by the laterally extending bag limits maneuverability and access into close quarters. Furthermore, and importantly, to attach the bag it is necessary for the operator to position himself closely adjacent the discharge opening and bend over closely thereto in order to align the connecting parts; it is then necessary for the operator to thrust the bag frame which he holds in his hands directly toward and practically into the mower discharge conduit.

In accordance with the present invention, a side discharge rotary power mower and bagging attachment therefor have been provided, in which the elongated bag extends rearwardly and closely adjacent the side of the mower, and without the necessity of separate or detachable elbows or derbris turning chutes. In addition, this has been accomplished without sacrificing efficient and forcible discharge of the debris from the housing into the bag and with complete and orderly filling of the latter.

Another aspect of the present invention relates to a mower of the above type in which the bag is easily and quickly placed in cooperative relationship with the housing by means of an intermediate bag carrier, which carrier can be attached to or detached from the housing with complete safety and by the operator remaining a safe distance from the mower. More specifically, the carrier and its attached bag can be connected to the housing by the operator having his hand above and a safe distance from the outlet opening and then lowering the carrier downwardly toward the top of the mower housing and into easily accessible and clearly discernible openings.

Still another aspect of the present invention relates to an improved bag carrier frame for use with a mower of the above type. In particular, the frame has means for preventing the lower portion of the bag adjacent the housing from being sucked or otherwise entering the housing and engaging the blades. The improved bag carrier frame can be easily, securely, and safely handled, detached from, and attached to complementary and easily accessible parts on the mower housing.

Another object of the present invention is to provide an improved debris catching bag for a generally rearwardly and laterally discharging rotary mower, which bag is so constructed so as to facilitate turning of the debris in a rearward direction as the latter is discharged from the mower, and do so in an efficient manner with orderly and complete filling of the bag.

These and other objects and advantages of the present invention will appear hereinafter as this disclosure progreses, reference being had to the accompanying drawings, in which:

FIGURE 1 is a perspective view of a rotary mower embodying the present invention, the view being taken generally from the front of the mower;

FIGURE 2 is another perspective view of the mower shown in FIGURE 1, but taken generally from the front right side thereof;

FIGURE 3 is a fragmentary, perspective view of the mower as shown in FIGURE 2, but on an enlarged scale, and with the bag removed from the bag carrier frame;

FIGURE 4 is a fragmentary, perspective view of the mower shown in FIGURE 1, but on an enlarged scale, and showing the bag carrier frame about to be attached to the mower housing;

FIGURES 5, 6, and 7, respectively, are plan, side elevational, and front elevational views of the bag carrier frame shown in FIGURE 3;

FIGURE 8 is a fragmentary plan view of the mower and bag attachment; and

FIGURE 9 is a view of the bag in a flattened or empty position.

Housing

Referring in greater detail to the drawings, the mower housing H encloses horizontally revolvable cutting blades 1 secured to the vertical drive shaft 2 that extends downwardly through the housing and is drivingly connected to the internal combustion engine E mounted on top of the housing.

The housing is supported for movement at a constant attitude over the ground by the wheels 3, 4, 5, and 6 suitably journalled at spaced locations around the housing and generally within the outer sides of the housing in a fore and aft direction in respect to normal mower travel.

The shape of the mower housing is that of an inverted volute channel C of ever-increasing cross-sectional area beginning at the smallest cross-sectional area, designated by reference numeral 8 in FIGURES 3 and 8, and terminating in an enlarged discharge opening 10. The discharge end is closely aligned with the outer limits of the wheels 5 and 6 at that side of the mower and is also located generally centrally of the housing in a fore and aft direction and between wheels 5 and 6.

It will be noted that the enlarged end portion 12 of the channel is directed rearwardly and laterally as viewed in plan (FIGURE 8) so that the material as it leaves the discharge opening 10 is forcibly ejected to the rear and laterally outward from the housing.

As clearly shown in FIGURE 3, a safety bar 13 is fixed, as by rivets 14, across the lower portion of the discharge opening 10 to help prevent accidental insertion of a person's foot or hand into the opening and into contact with the blades.

A pair of attaching members are also located on the housing and closely adjacent the discharge opening 10. These attaching means or members take the form of vertically extending apertures 15 and 16 (FIGURES 4 and 8) formed in extensions 15a and 16a, respectively, of the housing, one on each side of the discharge opening.

Handle attaching brackets 17 and 18 are formed integrally with and at the rear side of the housing and are of U-shape configuration which open in a rearward direction and receive the ends 19 and 20 of the generally U-shaped handle 21. The handle 21 is pivotally mounted in the brackets for swinging to any one of a number of operating heights and is capable of floating, that is, vertically swinging to a limited extent when in use. As clearly shown in FIGURES 3, 8, and 9, the pivot point for handle end 19 is formed by a pin 22 which extends through the bracket and end 19 is held captive therein by cotter key 23. The other end of the handle is similarly attached.

Bag Carrier Frame

An open frame F is formed of heavy steel wire or rod stock and functions to quickly, easily, and safely permit the operator to attach and detach an elongated, porous, and flexible collecting bag B directly to the housing and in direct grass receiving communication with the discharge opening.

The frame F has a vertical, opening defining frame comprised of an inverted, U-shaped member 24 having two parallel, spaced apart, and downwardly extending portions or posts 25 and 26. These posts slip readily downwardly into their respective apertures 15 and 16. The vertical frame F also has a handle 27 at the upper end thereof which is formed by the bight of the U-shaped member 24.

A laterally extending, bag supporting portion 29 extends outwardly and horizontally from the lower end of the member 24 and is welded thereto by brackets 30 and 31. This loop portion 29 is thus held a distance (see FIGURE 7) from the lower ends of posts 25, 26 so the latter can unobstructingly slip into their apertures 15 and 16.

A plurality of hooks 33, 34, 35, and 36 are welded to the frame and are spaced so as to be located around the discharge opening 10 and where they do not obstruct it.

When the frame is attached to the housing (FIGURE 3), it will be noted that the inner side 32 of portion 29 is in alignment with and adjacent the safety bar 13, and top side 27 is located above the discharge opening.

The open neck end of bag B is placed around the hooks and drawn tightly therearound and held there by a drawstring 38. The bag is attached to the frame and need not be removed therefrom until it is needed to be replaced by a new bag which is infrequently.

The discharge opening 10 is thus completely unobstructed and placed in direct grass discharging relationship to the bag.

The laterally extending portion 29 also extends rearwardly from the discharge opening and acts to support the attached bag B which rests thereon and prevents the bag from being sucked or accidentally pushed under the housing and into contact with the blades.

When the frame and its associated bag are to be attached to or removed from the housing, it is unnecessary for the operator to place his hands near the discharge opening 10 or attempt to align the connecting portions by thrusting the frame in a direction generally into the opening. Instead, the operator simply grasps the handle 27 and lowers the frame toward the housing, and he can then easily align the posts 25 and 26 with their respective openings 15 and 16, which are clearly visible from above.

The frame and the bag are thereby firmly attached directly to the housing and in direct communication with the rearwardly and laterally directed discharge opening.

The Bag

The bag B is elongated and extends rearwardly from the discharge opening 10 and has a loop 40 at its rear end for being supported by a rearwardly extending support rod R.

The bag is generally of porous cloth material and as previously indicated has an open neck end 41 around which is threaded the conventional drawstring 38.

This novel bag provided by the present invention functions to deflect or turn the discharged material in a rearward direction as it leaves the discharge opening, and with the present arrangement, there is no necessity for intermediate and detachable chutes or elbows.

The rear portion 44 of the bag is comprised of porous cloth material and may constitute the main portion of the elongated bag. The lowermost portion 44a (FIGURES 2 and 9) of the rear portion may be formed of stiffer cloth for withstanding wear. The bag is also supported intermediate its length by loop 45 that is engaged by hook 46 on rod R, and this intermediate support also functions to promote complete and orderly filling of the bag.

A grass deflecting or turning portion 47 is provided at the front end of the bag and adjacent the open neck end. This deflecting portion may be formed of stiffer and less porous material than the main body of the bag, or it may be plastic-coated on its interior surface.

Portions 44 and 47 are secured together, as at 48 by sewing, at an angle when the bag is viewed in plan (FIGURE 8). This results in a bag having a curved configuration extending laterally slightly but generally rearwardly from discharge opening 10.

As shown in FIGURE 9, the portion 47 has a narrow inner side 50 which is located opposite to deflecting outer side 49 and provides a turning front end for the bag in general.

As the clippings are discharged in a rearward and lateral direction from the housing, at least a portion of them impinge against the outer side 49 of deflecting portion 47 and are turned or deflected rearwardly thereby. As a result, the flow of clippings or other debris from the housing into the bag proper is smooth and continuous with no plugging or hesitation.

When the bag is filled, the attachment is easily removed from the housing, and the zipper 50 at the rear end is opened for complete and quick emptying thereof.

When the mower is operated without the bag attachment, the clippings are dispersed widely without a windrowing effect and without being directed at the operator.

*Bag Support Rod*

The previously mentioned rod R has an intermediate portion 52 which extends laterally to thereby provide that the rear portion 53 of the rod is laterally offset sufficiently from the housing to permit support of the bag intermediate its length, as previously mentioned. When the bag is to be emptied, its two loops can be easily slipped off their respective hooks on the rod.

The rod R places the entire weight of the bag and its contents on the mower housing, instead of on the handle 21, and thereby insures that the handle is free to float as desired, or be swung upwardly if necessary. In addition, the mounting of the rod is such that the rear ends of the rod and bag can swing laterally inwardly, as when striking an obstacle at that side of the mower. These desirable results are accomplished by the following mounting means.

Referring to FIGURE 3, the front end 54 of the rod extends vertically downwardly and is engaged in a vertical socket or aperture 55 formed at the side of the housing. The rod has a stop means 56 welded to its lower end and extending laterally from one side thereof for engagement with the housing to prevent the rod from swinging laterally outwardly from its normal operating position as shown by the full lines in FIGURE 1. The rod and bag can swing inwardly (broken lines in FIGURES 1 and 8) so as to clear any obstacles encountered at that side of the mower. When the obstacle has been passed, the bag swings back to its normal position, due to the action of the bag pulling it outwardly until the stop 56 again bears against the housing.

Various modes of carrying out the invention are contemplated as being within the scope of the following claims particularly pointing out and distinctly claiming the subject matter which is regarded as the invention.

We claim:

1. A support for a grass catching bag adapted to be attached to a rotary type lawn mower, said support comprising a substantially uniplanar frame defining an open central portion, bag engaging means on said frame, and support leg means substantially in the plane of said frame and extending outwardly thereof.

2. A support as defined in claim 1 including a portion extending laterally from one end of said frame for supporting said bag thereon.

3. A support as defined in claim 1 further characterized in that said engaging means comprises a plurality of hooks on said frame end around which said bag is adapted to be placed and secured thereto.

4. A support as set forth in claim 1 further characterized in that said leg means are generally parallel posts.

5. A support as defined in claim 1 including a handle extending outwardly from said frame.

6. A grass catching bag for a rotary lawn mower, said bag comprising an elongated body having a lateral curve, an open neck end, attaching means adjacent said neck end, and a grass deflecting portion adjacent said neck end, whereby grass discharged into said bag through said open neck end impinges against said deflecting portion and is turned into the other end of said elongated body.

7. A bag as defined in claim 6 further characterized in that said elongated body also has a main body portion of generally porous cloth material.

8. A bag as defined in claim 6 further characterized in that said deflecting portion and said main body portion are connected together to form said lateral curve.

9. A bag as defined in claim 6 further characterized in that said deflecting portion is of stiffer and less porous material than the remainder of said body.

10. In combination, a rotary lawn mower housing having a rearward and lateral grass discharge opening, two spaced apart attachment members on said housing and adjacent said opening at opposite sides thereof, a support for a grass catching bag and comprising a substantially uniplanar frame defining an open central portion in alignment with said housing opening, bag engaging means on said frame, support leg means substantially in the plane of said frame and extending outwardly thereof to engage said housing attachment members, and an elongated bag having an open neck end detachably embracing said frame and extending rearwardly of said housing.

11. The combination as described in claim 10 further characterized in that said support includes a laterally extending portion of said frame for supporting the bag thereon.

12. The combination as defined in claim 10 including a plurality of hooks on said frame and around which said bag neck end is adapted to be placed and secured thereto.

13. The combination set forth in claim 10 further characterized in that said leg means are generally parallel posts and said attachment members are apertures in said housing at opposite sides of said opening.

14. The combination as defined in claim 10 including a handle extending outwardly from said frame.

15. A grass catching attachment for a rotary lawn mower housing having a lateral grass discharge opening, said attachment comprising in combination; a bag support comprising a substantially uniplanar frame defining an open central portion, bag engaging means on said frame, and support leg means substantially in the plane of said frame and extending outwardly thereof; and a grass catching bag comprising an elongated body having a lateral curve, an open neck end, and attaching means adjacent said neck end for engagement with said bag engaging means.

16. In combination, a rotary power lawn mower having a blade housing with a rearwardly and laterally directed discharge opening, an elongated grass catching bag comprising an elongated body having a lateral curve, an open neck end, attaching means adjacent said neck end and engageable with said housing and placing said open neck end in communication with said discharge opening, and a grass deflecting portion adjacent said neck end, whereby grass discharged into said bag through said open neck end impinges against said deflecting portion and is turned into the other end of said elongated body.

References Cited in the file of this patent

UNITED STATES PATENTS

| | | |
|---|---|---|
| 2,016,294 | Replogle | Oct. 8, 1935 |
| 2,836,029 | Johnson | May 27, 1958 |
| 2,918,694 | Tarrant | Dec. 29, 1959 |
| 2,932,146 | Campbell | Apr. 12, 1960 |
| 2,973,614 | Horner et al. | Mar. 7, 1961 |

FOREIGN PATENTS

| | | |
|---|---|---|
| 1,228,918 | France | Sept. 2, 1960 |